United States Patent
Abraham et al.

(10) Patent No.: US 7,269,123 B2
(45) Date of Patent: Sep. 11, 2007

(54) WAVELENGTH SELECTIVE COATINGS FOR OPTICAL DISC SECURITY

(75) Inventors: Nigel Abraham, Highlands Ranch, CO (US); Mark T. Turnage, Denver, CO (US); Patrick Byrne, Ojai, CA (US); John Town, Ojai, CA (US)

(73) Assignee: Optical Security Group, Inc., Denver, CO (US)

( * ) Notice: Subject to any disclaimer, the term of this patent is extended or adjusted under 35 U.S.C. 154(b) by 244 days.

(21) Appl. No.: 11/146,765

(22) Filed: Jun. 7, 2005

(65) Prior Publication Data

US 2006/0274637 A1   Dec. 7, 2006

(51) Int. Cl.
   *G11B 7/26*   (2006.01)
   *G11B 7/00*   (2006.01)
(52) U.S. Cl. .................... 369/283; 369/103; 369/275.1
(58) Field of Classification Search .. 369/275.1–275.5, 369/103, 273, 283, 274, 286, 288, 280, 277; 428/64.4
   See application file for complete search history.

(56) References Cited

U.S. PATENT DOCUMENTS 5,452,282 A   9/1995 Abraham
5,533,002 A   7/1996 Abraham
6,011,767 A * 1/2000 Abraham .................... 369/103
6,160,789 A   12/2000 Abraham

FOREIGN PATENT DOCUMENTS

WO   WO 01/03945 A1   1/2001

OTHER PUBLICATIONS

J ; Shen, C Y Chang, H C Liu, W C Chou, Y F Chen, T Jung, and M C Wu, "Reflectivity and photoluminescence studies in Bragg reflectors with absorbing layers", Institute of Physics Publishing, Semiconductor Science and Technology , Aug. 200, Apr. 2001.
http://whatis.techtarget.com/definition/0,,sid9_gci213923,00.html, no date.
http://searchstorage.techtarget.com/sDefinition/o,,sid5_gci811276,00.html, no date.

* cited by examiner

*Primary Examiner*—Ali Neyzari
(74) *Attorney, Agent, or Firm*—William F. Lang, IV; Arnold B. Silverman; Eckert Seamans Cherin & Mellott, LLC

(57) ABSTRACT

An optical disc for data storage includes a layer of color-shifting material. Light passing through the color-shifting layer will have a color determined by the various constructive and destructive interference of the various wavelengths after they have passed through the material, diffracted while passing through the material, and are reflected off of various portions of the material, resulting in a color change when the viewing angle is changed. Additionally, an optical variable device may be defined within the disc, and may include the color-shifting layer.

38 Claims, 9 Drawing Sheets

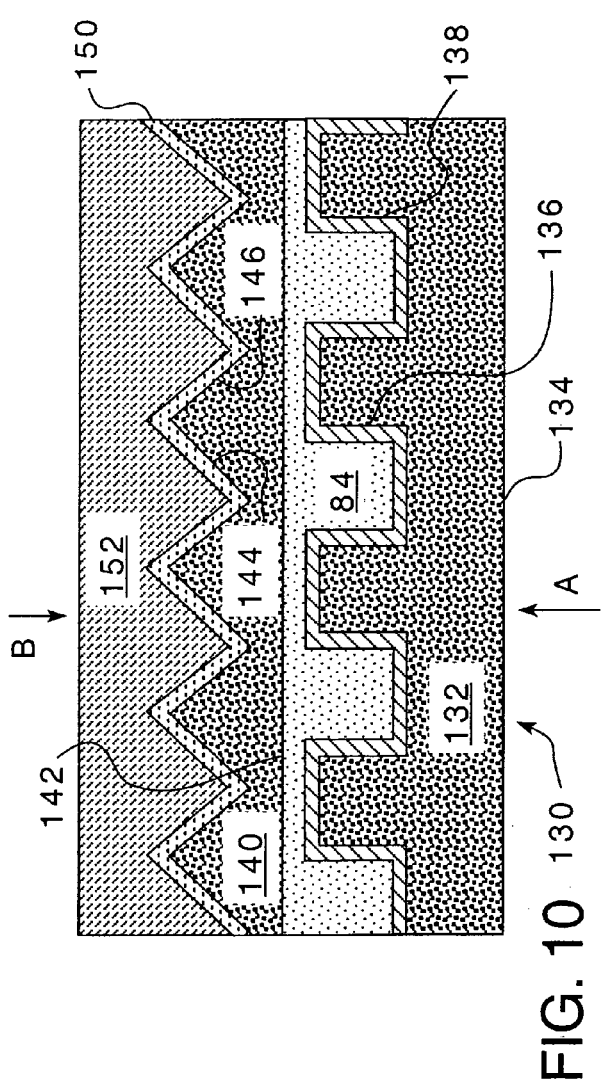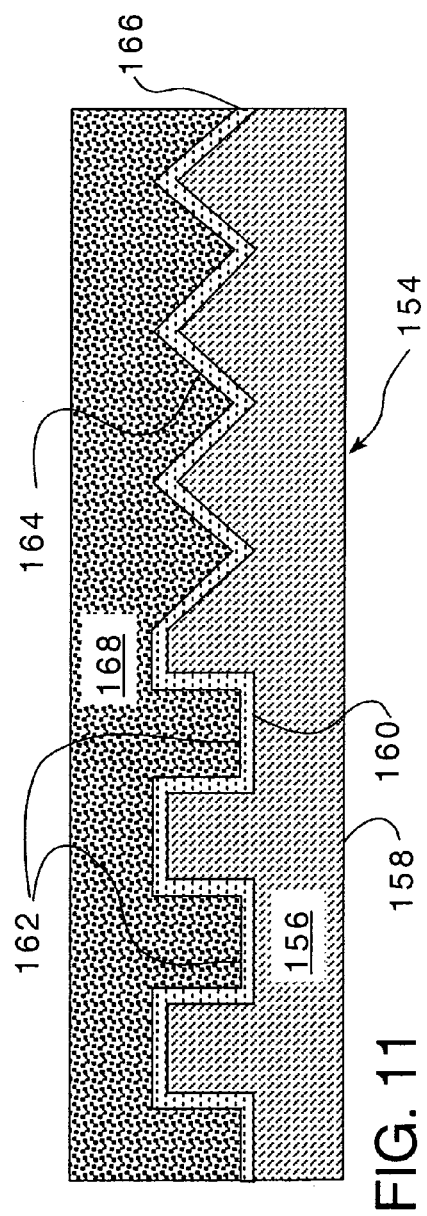

WAVELENGTH SELECTIVE COATINGS FOR OPTICAL DISC SECURITY

BACKGROUND OF THE INVENTION

1. Field of the Invention

The present invention relates to optical discs for data storage. More specifically, the present invention provides an optical disc having either an optical variable device such as a hologram and/or a varying color, depending upon the angle at which it is viewed, to identify the disc as an original and not a counterfeit.

2. Description of the Related Art

Optical discs are increasingly used for data storage, including computer software. Presently available optical discs include pre-recorded and recordable versions of compact discs (CDs) and digital versatile discs (DVDs). Future pre-recorded and recordable optical disc formats have also been announced including Super Audio CD (SACD), HD-DVD and Blu-ray (BD) which have similar disc construction and similarly lend themselves to the inventions and applications mentioned herein.

CDs of 80 mm and 120 mm diameter and 1.1-1.3 mm thickness construction are typically made by first producing a transparent plastic disc (typically polycarbonate), having a single layer or pattern of indentations on one side. The indentations ("pits") will have similar depth and width, but will have varying discrete circumferential lengths. The pits will be arranged into a single spiral track leading from an inner diameter of the disc to the outer diameter such that the track spacing between successive turns of the spiral track is approximately 1.6 microns. The side of the CD having the indentations is coated with a thin film metal layer having good light reflective properties, for example, aluminum, by well-known methods including vacuum coating or sputtering. Next, a protective covering such as a transparent lacquer is applied over the reflective layer, with the protective layer being cured by exposure to ultraviolet light and a printed label is applied over the protective lacquer. The information on the CD is read by focusing a laser onto the indentations through the underside of the disc (opposite side of the printed label), so that the laser passes through the polycarbonate, and is reflected back through the polycarbonate by the reflective layer, such that the reflected beam can be analyzed to determine the characteristics of the indentations and the data stored therein.

DVDs have nominally the same physical dimensions as CDs but are constructed from two approximately 0.6 mm thick plastic disc component substrates bonded together with the data surfaces adjacent to and opposing each other at the bonding surfaces. Each 0.6 mm component substrate is able to contain up to two discrete layers of indentations applied to the top surface; in the case that two layers of indentations are present on one component disc substrate, the spacing is approximately 40-70 microns in the plane of the disc surface. As a result, DVDs may be constructed with up to two discrete data surfaces on each component disc substrate and data is readable from one or two sides of the disc; this gives rise to a family of named DVD disc constructions related to the "layers" of data storage capacity and the read format. DVD5 is single-sided read single-layer data surface construction; DVD9 is single-side, dual-layer data construction; DVD10 is single-layer, dual-side; DVD14 is dual-side, one single-layer and one dual-layer component; DVD18 is dual-sided dual-layer construction. DVD introduces the concept of dual-layer data readout in the DVD9, DVD14 and DVD18 products; this is achieved by applying a semi-reflective thin film coating to the outer data surface followed by an opaque (fully reflective) thin film metal coating to the adjacent innermost data surface on the dual-layer disc.

BD disc products are of similar physical construction to CD discs although the data surface is read through the protective lacquer "cover" layer of approximately 100 microns thickness. HD DVD disc products are of similar physical construction to DVD discs.

The frequency of unlawful copying of optical discs (and other storage media), combined with the passing of these copies as lawful copies for which the proper royalties were paid to the copyright holder, results in the need for a means for distinguishing an authentic lawful disc from an unlawful copy or counterfeit.

N. C. Abraham's U.S. Pat. No. 5,452,282 discloses a process for producing an optical data storage disc having both a digital recording and a holographic image. The digital recording occupies one portion of the disc, and the hologram occupies any portion of the disc that is separate from the data. The hologram may therefore be located on the outer circumference of the disc, or on the inner portion of the disc, or at any other location where data is not present. The hologram will typically be on the same layer as the data.

N. C. Abraham's U.S. Pat. No. 5,533,002 discloses an optical disc having one side from which the digital data may be read, and a second side that is embossed with a relief pattern defining a holographic image. After applying a layer of metal over the side of the transparent polycarbonate disc containing the indentations, along with the UV-cured protective lacquer, the lacquer coating is embossed with a hologram using heat and pressure. Alternatively, the hologram may be produced within the lacquer by casting. The embossed lacquer layer is then covered with another metal layer, followed by a final UV-cured lacquer layer. The data may thereby be read from one side of the disc, through the transparent polycarbonate and the hologram will be visible on the other side of the disc, through the transparent lacquer.

N. C. Abraham's U.S. Pat. No. 6,160,789 discloses an optical storage disc. The disc is formed using a first polycarbonate disc having a relief pattern defining digital data, having a reflective coating over the relief pattern, and a second polycarbonate disc having a relief pattern defining a hologram, also covered by a reflective coating. The two reflective coatings are adjoined by an adhesive layer therebetween, resulting in a disc that is readable from one side and having a hologram that is viewable from the other side. In other embodiments, the relief pattern is formed within a lacquer coating applied to a flat surface of the second disc. Still other embodiments utilize a plurality of layers having digital data, in the same manner as a DVD.

International patent application number PCT/US00/10985 (publication no. WO 01/03945), published on Jan. 18, 2001, discloses an optical coating having multiple layers of dielectric, and possibly a layer of metal, which produces an observable color shift as the angle of incident light or the viewing angle changes. This patent is primarily directed towards the use of the color-shifting layer in conjunction with a hologram and does not teach that such a color-shifting coating may be used as a reflective, data-containing layer, in an optical disc.

It is desirable to provide a data storage optical disc providing a color that changes according to the angle at which the disc is viewed, and in some embodiments, providing an optical variable device viewable from one side. It is further desirable to produce a disc having the appearance of a changing color with respect to the angle at which it is viewed, when viewed from the readable side of the disc.

Such a disc would be particularly difficult to duplicate by those who would counterfeit the information stored thereon. Furthermore, a surface having a different color depending upon the angle at which it were viewed would be usable as a security measure for both single-side and double-sided discs.

SUMMARY OF THE INVENTION

The present invention provides an optical disc for data storage wherein at least one layer, preferably on the label side of the disc, is replaced by a color-shifting layer that may be a liquid crystal layer. Light passing through the liquid crystal will diffract into its various wavelengths while passing through one or more sub-layers of the color-shifting layer. The individual wavelengths will be reflected from the surface of other different sub-layers within the color-shifting layer. The resulting visible color will result from the constructive and destructive interference of the reflected wavelengths with each other. Viewing the disc from a different angle will result in a color generated by a different pattern of constructive and destructive interference. Therefore, viewing the disc from the side opposite the data side will result in the appearance of a changed color as the angle at which the disc is viewed is changed.

Additionally, an optical variable device such as a hologram, a diffraction grating, or a holographic diffraction grating may be formed on the label side or within any section of the data side that is spatially separated from the data. A diffraction grating is a sequence of fine grooves and ridges (typically 0.5 to 2 microns measured peak to peak) that diffract light into its various colors. A holographic diffraction gyrating, uses the constructive and destructive interference of these different colors of light to create light and dark areas. The optical variable device may be formed in conjunction with a liquid crystal layer to incorporate the color-shifting feature provided by the liquid crystal into the optical variable device.

The present invention therefore provides two possible security features; the optical variable device, and the color change feature. The color change feature and optical variable device may be viewable from either the label side of the disc, or may be incorporated anywhere on the data side of the disc that is spatially separated from the data. These features will be quite difficult for one attempting to make an illegal copy of the optical disc to duplicate, making it easy for consumers to determine whether a disc they are about to purchase is a legal or illegal copy.

Optical disc technology offers many possibilities for variations in disc construction related to the optical and physical requirements of the readout and storage system. The inventions and applications contained herein are applicable to any disc construction featuring single or multiple planar data surfaces covering a surface of the disc in question. For example, hybrid Super-Audio CD (SACD) features DVD physical disc construction with two bonded component substrates with a high-density data surface at the bonding layer and a CD data surface at the outer surface of the opposing substrate; either data surface may have application to the inventions herein.

It is therefore an object of the present invention to provide an optical disc having a means for visually verifying its authenticity.

It is another object of the invention to provide an optical disc having means for visually verifying its authenticity that may be viewed from either the label side of the disc and/or the data side of the disc.

It is a further object of the invention to provide a double-sided optical disc having means for visually verifying its authenticity.

It is another object of the invention to provide an optical disc having a color change feature with a range of colors controlled by the chemistry and/or orientation of a liquid crystal color shifting layer.

It is a further object of the invention to provide an optical disc having a color change feature, displaying a changing color with respect to changes in the angle at which it is viewed.

It is another object of the invention to provide an optical disc having a color change feature that may be used in conjunction with an optical variable device to provide visual verification of the disc's authenticity.

It is a further object of the invention to provide a method of manufacturing an optical disc having a color change feature for visual verification of the disc's authenticity.

It is another object of the invention to provide a method of manufacturing an optical disc having a means of visually verifying its authenticity that is efficient and cost-effective.

These and other objects of the invention will be more fully understood by reference to the drawings and description below.

BRIEF DESCRIPTION OF THE DRAWINGS

FIG. 10 is a cross sectional view of a CD including an optical variable device according to the present invention.

FIG. 11 is a cross sectional view of a CD according to the present invention, incorporating an optical variable device.

Like reference characters denote like elements throughout the drawings.

DETAILED DESCRIPTION OF THE PREFERRED EMBODIMENTS

The present invention provides an optical disc for data storage, including a color-shifting layer made from liquid crystal, that changes color as the angle at which it is viewed changes.

Figure 1:
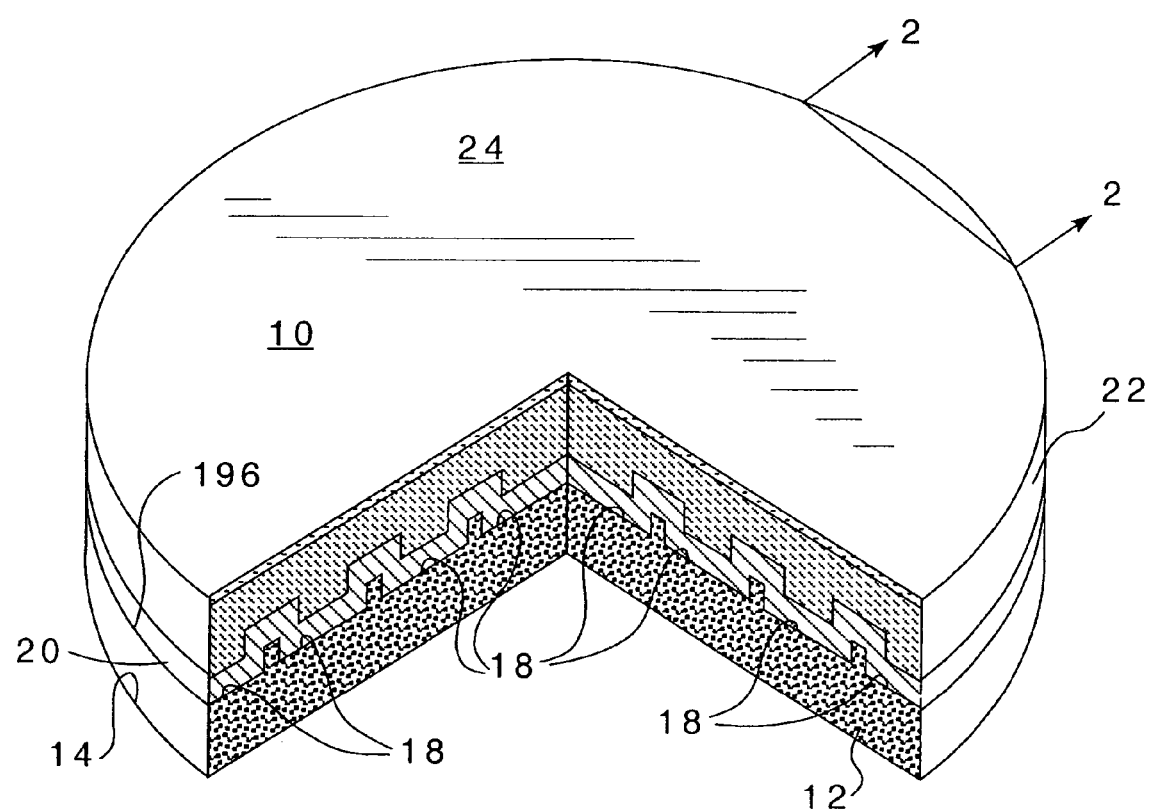
FIG. 1 is an isometric, partially sectional view of a compact disc according to the present invention.
Figure 2:
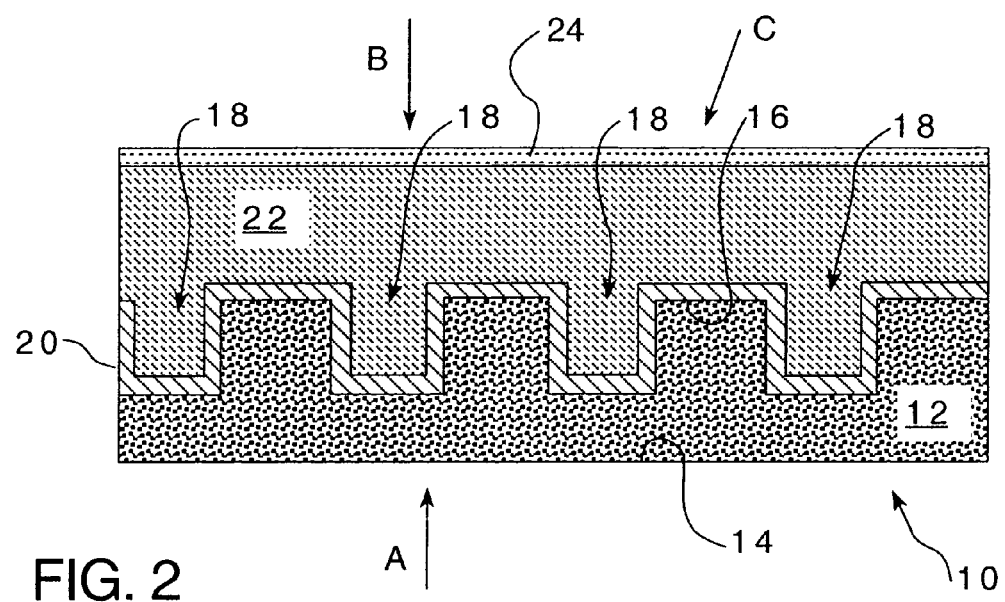
FIG. 2 is a cross-sectional view of a compact disc according to the present invention, taken along the lines 2-2 in FIG. 1.

FIGS. 1-2 illustrate a compact disc 10, formed from a transparent polycarbonate disc 12 having an optically flat side 14 and an imprinted side 16 defining a plurality of indentations 18. The imprinted side 16 has been covered with a reflective layer 20. A protective coating 22 may be a lacquer or a thermoplastic coating. Lastly, a color shifting layer in the form of a liquid crystal layer 24 is applied onto the protective coating 22, forming the label side of the disc.

Figure 3:
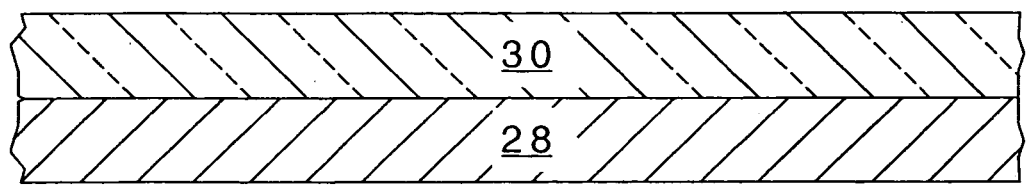
FIG. 3 is a cross-sectional view of a pair of liquid crystal layers for an optical disc according to the present invention.
Figure 4:
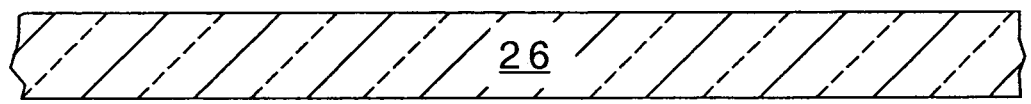
FIG. 4 is a cross-sectional view of a liquid crystal layer for an optical disc according to the present invention.

Referring to FIGS. 3-4, a pair of alternative arrangements of the liquid crystal layer 24 are illustrated. In general, the liquid crystal layer 24 will be formed from a cholesteric liquid crystal material, although a nematic material could be used as well. Cholesteric liquid crystal materials are typically applied by processes including silk screening, gravure coating, reverse gravure coating, or flexography. All of these methods are well known to those skilled in the art. Describing these methods briefly, silk screening versus the use of a polyester screen with ultraviolet resin imbedded within it. UV resin cures the liquid crystal material as it is applied. Gravure coating transfers the liquid crystal material to the label side of the disc using a dimpled cylinder. Reverse gravure coating uses a pair of rollers going in opposite directions to transfer the liquid crystal material onto the disc 10. Flexography involves the transfer of the liquid crystal material from the roller onto a stamp, such as a rubber stamp, which is then transferred to the surface of the disc 10. Slot coating is the squirting of liquid crystal material onto the disc under pressure. All of these application processes will typically orientate the liquid crystal molecules in a direction that is substantially parallel to the surface of the disc 10, and controlled by the direction in which they are applied to the disc 10. After application of the liquid crystal material, the liquid crystal is cured using ultraviolet light, thereby cross-linking the individual molecules.

The resulting liquid crystal layer will function much like a Bragg reflector, a prior art device consisting of alternating quarter-wave layers, with each layer being made from a material having a different refractive index than the adjacent layers. Light passing through the liquid crystal layer will therefore be diffracted into its different wavelengths, each of which will penetrate the liquid crystal layer to a certain depth, be reflected upon reaching a boundary of a layer with a refractive index that results in such a reflection, and pass back out through the various layers. The wavelength will then have either a constructive or a destructive effect on light having other wavelengths, depending on how the different wavelengths interact.

The color shift provided by the liquid crystal layer 24 can be controlled by the temperature under which it is applied, the orientation of the molecules within the layer, and the specific cholesteric monomers within the layer. Each layer may be one or more cholesteric monomers, depending the specific color shift desired. A preferred color shift, for example, is a color shift from orange to green depending on the viewing angle, or a color shift from green to blue, depending on the viewing angle.

Referring back to FIGS. 3-4, the layer 24 may be a single layer 26 illustrated in FIG. 4. Alternatively, a first layer 28 of FIG. 3 may be applied so that the molecules are orientated in a first direction, forming the background of an image such as a bar code, a picture, a checkerboard pattern, or other image. The foreground for the image is formed by depositing a second layer 30 on top of the first layer 28. The second layer 30 may have its molecules orientated in a different direction than the molecules of the first layer 28, for example, the layer 30 may be orientated approximately 90° from the layer 28. When the layers 28,30 are applied in this manner, the background 28 will exhibit a color shift when the viewing angle changes within one plane, and the foreground 30 will exhibit a color shift when the viewing angle changes within a plane oriented 90° from the first plane. Additionally, the layers 28 and 30 may utilize different combinations of cholesteric liquid crystal monomers. The layer 30 will therefore exhibit a different color shift pattern than the layer 28. For example, a color shift of blue to green may occur within the layer 28, and a color shift from green to orange may occur within the layer 30. Therefore, as the viewing angle changes, the image formed by the layers 28,30 will remain visible, but the colors of the foreground and background will each change.

A typical thickness of the layer 24 will be approximately ten times the wavelength of the color of light that is desired. For example, if green is one of the colors desired, its 500 nanometer wavelength requires a coating at least five microns thick.

Figure 5:
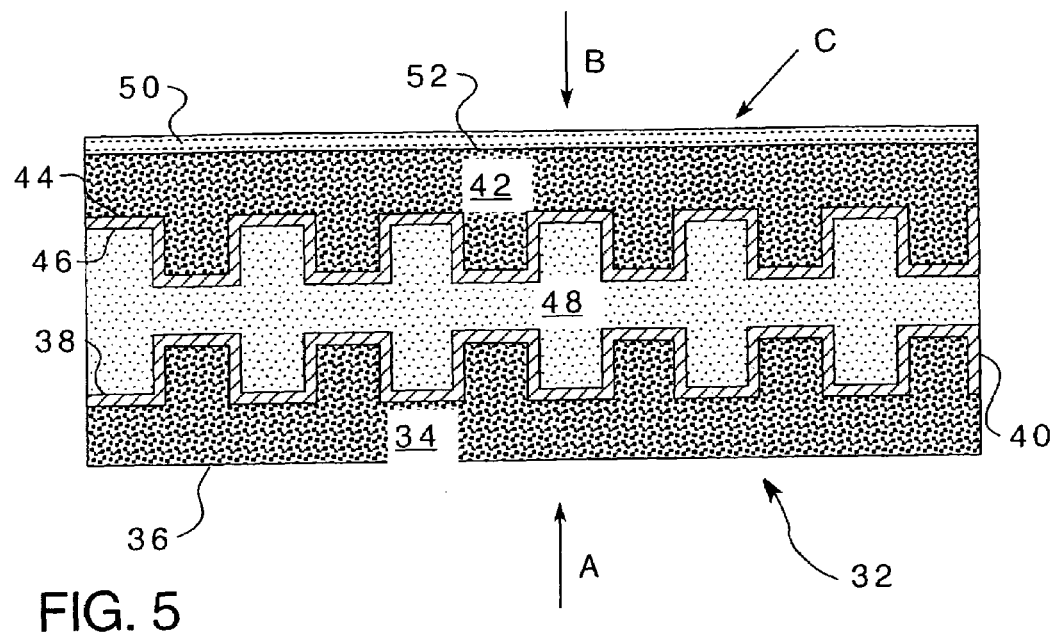
FIG. 5 is a cross-sectional view of a DVD9 according to the present invention.

Referring to FIG. 5, DVD9 32 is illustrated. DVD9 32 includes a polycarbonate disc 34, having a flat side 36 and an imprinted side 38. The imprinted side 38 is covered with a semi-transparent reflective coating 40. A second transparent polycarbonate disc 42 will have its imprinted side 44 coated with opaque reflective layer 46. The discs 34, 42 are secured together by transparent, optically clear adhesive 48 between the layers 40, 46. A liquid crystal layer 50 is deposited on the flat side 52 of the disc 42, corresponding to the label side of the disc 32. The disc may be read from the direction of arrow A. When a disc is viewed from the direction of arrow B, light will penetrate the color shifting layer 50, and be reflected off this layer. The wavelength, and therefore the color, of the reflective light will be a function of the distance the light must pass through the color shifting layer 50. When the disc 32 is viewed alone the arrow C, the various wavelengths of light will travel through a greater distance of color shifting layer 230 before being reflected off of the appropriate sub-layer within the liquid crystal, as compared with viewing the disc 32 from the direction of arrow B. As a result, depending on the relationship between the viewing angle and the direction of orientation of the liquid crystal material, the various constructive and destructive interferences of the various wavelengths exiting the liquid crystal result in different colors becoming apparent as the disc 32 is viewed from different angles.

Figure 6:
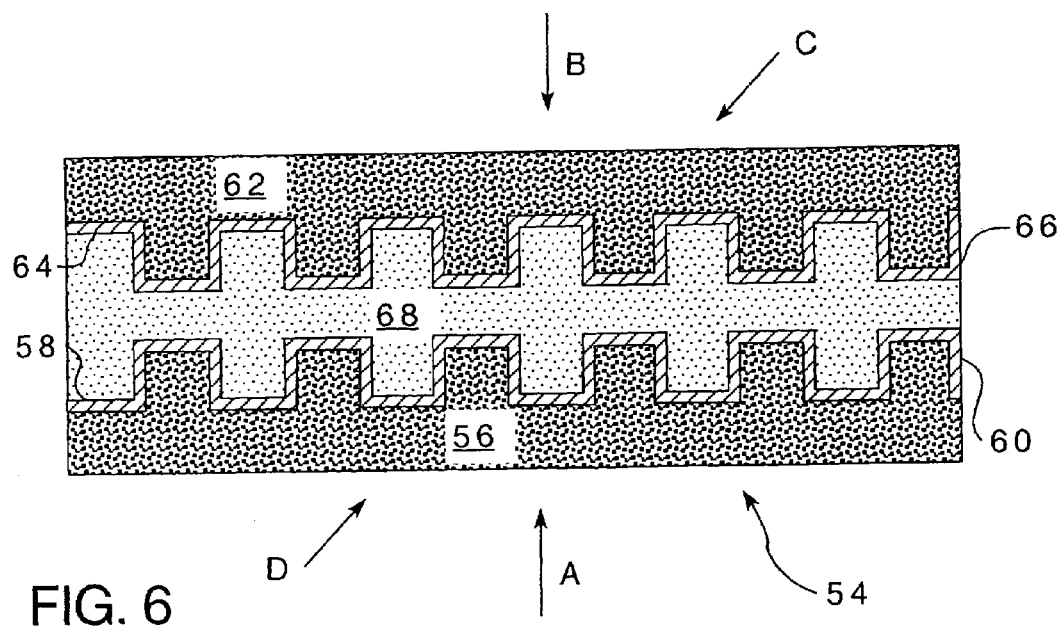
FIG. 6 is a cross-sectional view of another DVD9 according to the present invention.

Referring to FIG. 6, a DVD9 54 is illustrated. The DVD9 54 includes a polycarbonate disc 56, having an imprinted side 58 covered with a semi-transparent reflective coating 60. A second transparent polycarbonate disc 62 has its imprinted side 64 coated with a liquid crystal layer 66. The discs 56, 62 are secured together by a transparent, optically clear adhesive 68 between the layers 60, 66. Both the semi-transparent reflective layer 60 and the color shifting liquid crystal layer 66 may now be read from the side of the disc corresponding to arrow A. When the disc is viewed from the direction of arrows A or B, light will penetrate the color shifting layer 66, and be reflected off this layer. The wavelength, and therefore the color, of the reflected light will be a function of the constructive and destructive interference of the various wavelengths of light as they pass through the color shifting layer 66 to the appropriate depth for each wavelength, and are then reflected off of the deeper sub-layers within the layer 66. When the disc 54 is viewed along arrows C or D, light will travel through the layer 66 a greater distance than when viewed from the direction of arrow A or B, resulting in different constructive and destructive interference patterns, resulting in different colors becoming apparent, depending on the relationship between the angle at which the disc is viewed to the orientation of the liquid crystal material.

Figure 7:
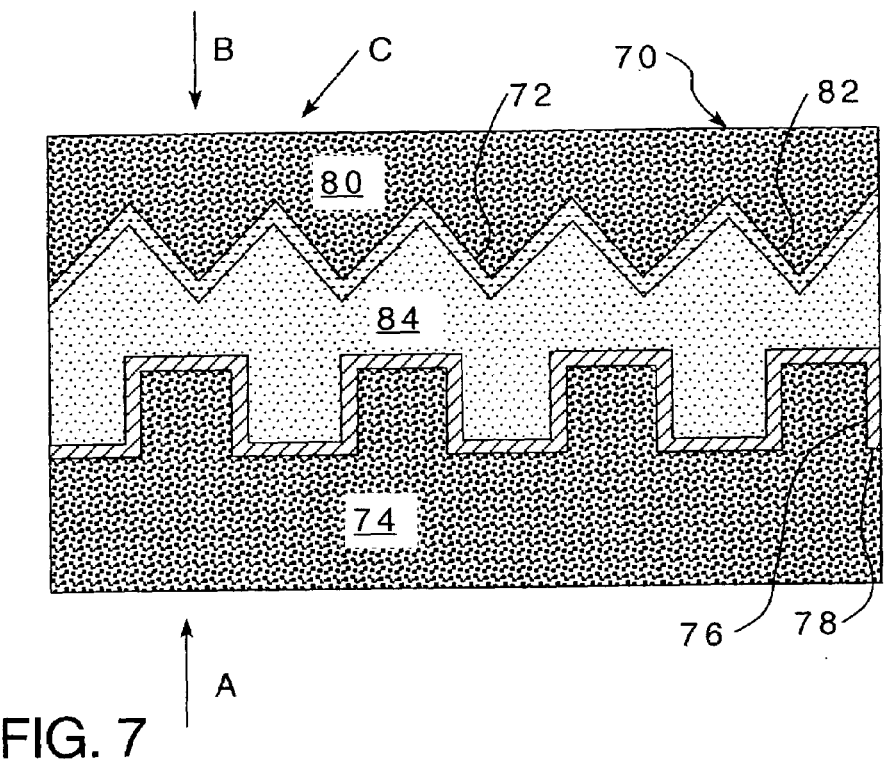
FIG. 7 is a cross-sectional view of a DVD5 according to the present invention, and including an optical variable device.

Referring to FIG. 7, a DVD5 70 incorporating an optical variable device 72 is illustrated. The DVD5 70 includes a transparent polycarbonate disc 74, having an imprinted side 76, to which a reflective layer 78 has been applied. A second transparent polycarbonate disc 80 includes an optical variable device 72, which may be a hologram. The polycarbonate disc 80 may be formed according to U.S. Pat. No. 6,160,789, expressly incorporated herein by reference. A liquid crystal coating 82 is applied over the optical variable device 72. The layers 78, 82 are joined by the transparent, optically clear adhesive 84. The DVD5 70 may therefore be read from the direction of arrow A. When viewed on the label side, from the direction of arrow B, the color shifting feature of the layer 82 will become apparent as the angle of viewing changes, for example, from the direction of arrow B to the direction of arrow C.

Figure 8:
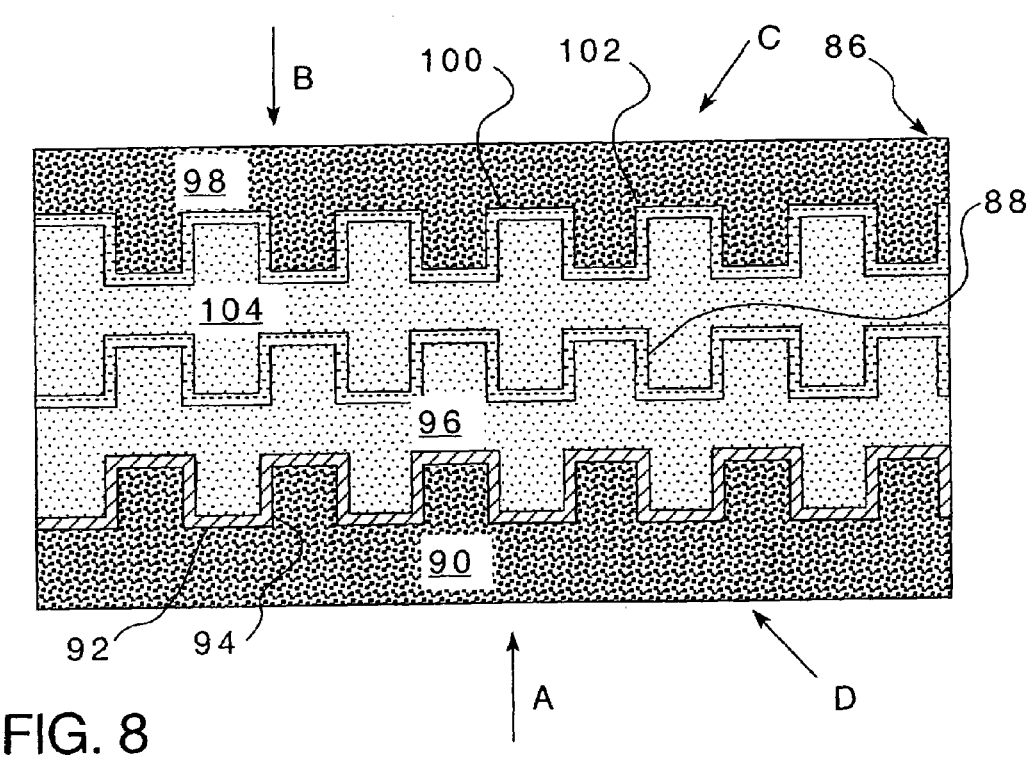
FIG. 8 is a cross-sectional view of a DVD14 according to the present invention.

Referring to FIG. 8, a DVD14 86 is illustrated. The DVD14 86 is made by beginning with a transparent polycarbonate disc having a release coating on its imprinted side, or an acrylic disc, which does not require a release layer. A reflective coating 88, which may be a color-shifting liquid crystal layer, is deposited on the imprinted side of the side. A second polycarbonate disc 90 having an imprinted side 92 is provided with a semi-transparent layer 94. The layers 82, 94 are then secured together using a transparent, optically clear adhesive 96. The first transparent polycarbonate disc is then separated from the layer 88 and discarded. A third transparent polycarbonate or acrylic disc 98 has an imprinted side 100 upon which a reflective coating 102 has been deposited. The reflective coating 102 may be a color shifting liquid crystal layer. The layers 102, 88 are secured together using a transparent, optically clear adhesive 104. The resulting disc 86 is double-sided, so that reading the disc from the direction of arrow A will permit reading the information stored on the semi-transparent layer 94 or the reflective coating 88. Reading the disc from the direction of arrow B will permit reading the information stored in the layer 102. Because one or more of the layers 88, 102 are color shifting layers, the color change feature when the disc 86 is viewed from different angles is present on both sides of the disc 86.

Figure 9:
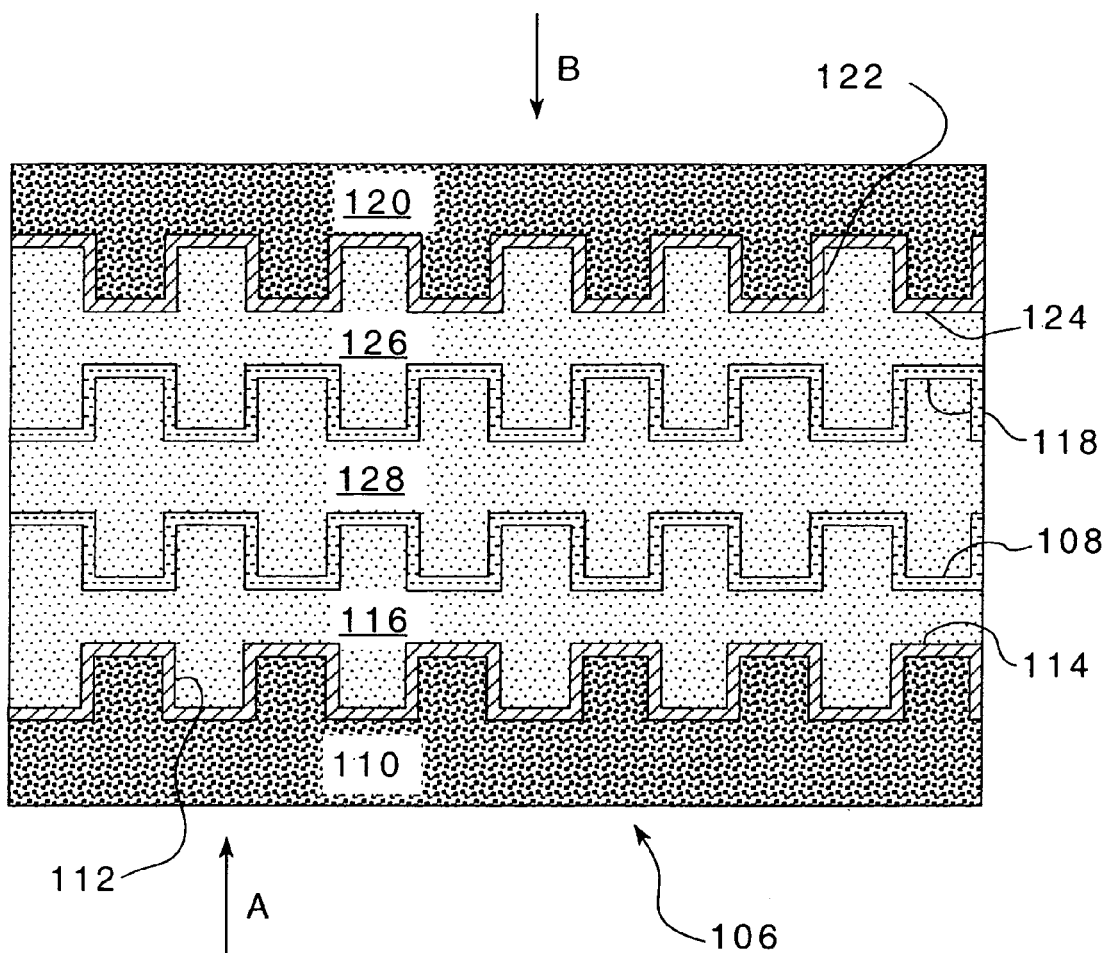
FIG. 9 is a cross-sectional view of a DVD18 according to the present invention.

Referring to FIG. 9, a DVD18 106 is illustrated. The disc 106 is made by beginning with a transparent polycarbonate disc having a release coating on its imprinted side, or an acrylic disc, which does not require a release layer. A reflective coating 108 is deposited on this imprinted side. The reflective coating 108 may be a liquid crystal color shift layer. A second polycarbonate disc 110 includes an imprinted side 112 having a semi-transparent reflective coating 114. The layers 108, 114 are secured together using a transparent, optically clear adhesive 116. The first transparent polycarbonate disc is then separated from the layer 108 and discarded. A third polycarbonate disc is provided with a reflective coating 118 on a release layer applied to its imprinted side, which may be a color shifting liquid crystal layer. A fourth polycarbonate disc 120 having an imprinted side 122 is provided with a semi-transparent layer 124. The layers 118, 124 are secured together using a transparent, optically clear adhesive 126. A third disc is removed and discarded, and the layers 108, 118 are secured together using an adhesive 128. The resulting disc 106 is double-sided, so that reading the disc from either the direction of arrow A or the direction of arrow B will permit reading the information stored in one of the two semi-transparent layers 114, 124, and one of the opaque layers 108, 118. The color change feature is also viewable when the disc 106 is viewed from different angles, from either side of the disc.

Referring to FIG. 10, a CD 130 is illustrated. The CD 130 includes a transparent disc 132 having an optically flat side 134 and an imprinted side 136. The imprinted side 136 is covered with a reflective coating 138. A second polycarbonate disc 140 having a flat side 142 and an imprinted side 144 upon which an optical variable device 146 has been imprinted, is secured to the layer 138 by the adhesive 148, securing the flat side 142 to the layer 138. The imprinted side 144 is covered with a reflective layer 150, which may be a liquid crystal layer. A lacquer 152 has been applied over the color shifting layer 150. The disc 130 may therefore be read from the direction of arrow A, and may display a color shift when viewed from the direction of arrow B.

Referring to FIG. 11, a CD 154 is illustrated. The CD 154 includes a polycarbonate disc 156 having a flat side 158 and an imprinted side 160. The imprinted side 160 includes a plurality of data indentations 162, and an optical variable device 164 that is spatially separated from the data indentations 162. The imprinted side 160 is covered with a color shifting layer 166, which may be a liquid crystal layer. A protective lacquer 168 is applied above the coating 166. By locating the optical variable device 164 in a location that is spatially separated from the data indentations 162, the same color shifting layer 166 may be used for both the data indentations 162 and the optical variable device 164. The optical variable device 164 may, for example, be located in the central portion of a CD, which is typically not read. It will be readily apparent from the above description that such an optical variable device may be located within any data-containing layer of any type of optical storage disc, provided that it is spatially separated from the data indentations.

Figure 12:
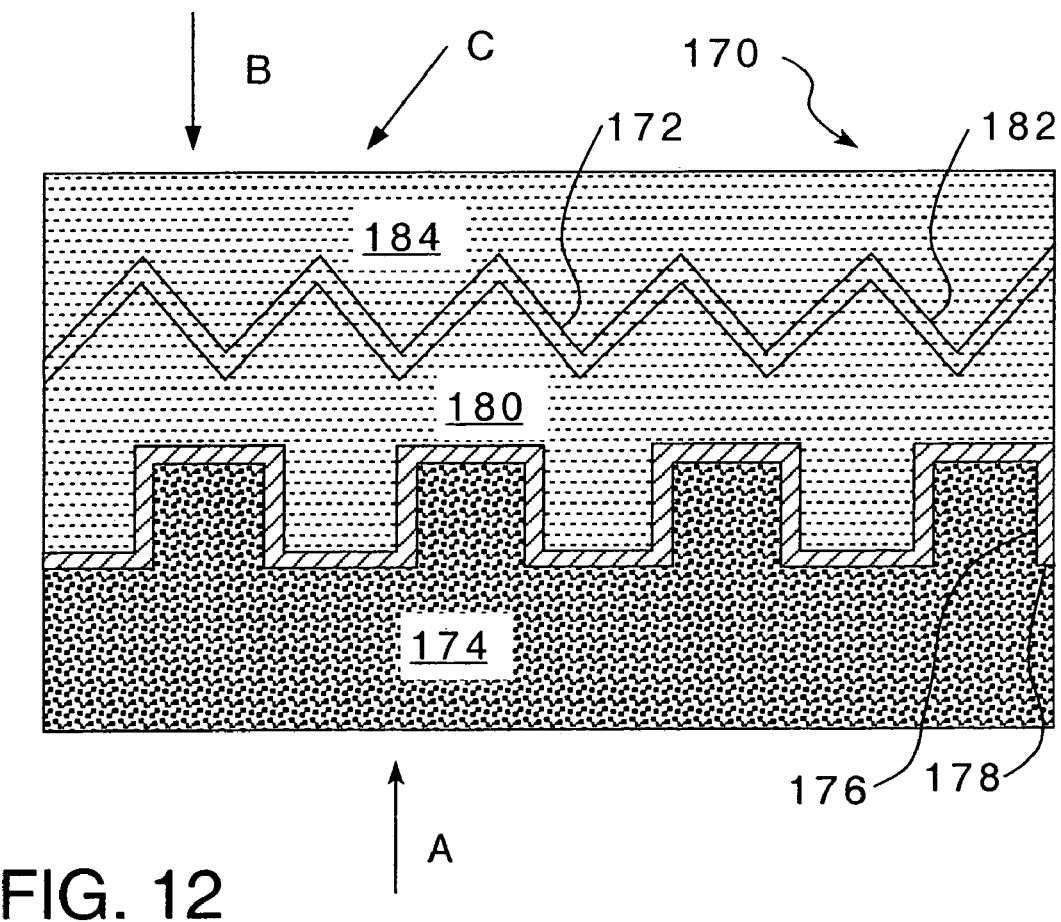
FIG. 12 is a cross sectional view of a CD according to the present invention, incorporating an optical variable device.

Referring to FIG. 12, a CD 170 having an optical variable device 172 is illustrated. The CD 170 includes a polycarbonate disc 174 having an imprinted side 176 upon which a reflective coating 178 has been deposited. A protective laquer 180 is applied over the reflective coating 178. The optical variable device 172 is formed within the lacquer 178 as described in U.S. Pat. No. 5,533,002, expressly incorporated herein by reference. The laquer 178 may be embossed with an optical variable device 172 using heat and pressure. Alternatively, the optical variable device 172 may be produced within the lacquer 178 by casting. The optical variable device 172 is covered with a reflective layer 182, which may be a liquid crystal layer. A lacquer 184 is applied over the color shifting layer 182. The disc 170 may therefore be read from the direction of arrow A, and may display a color shift when the viewing angle for the label side changes from, for example, the direction of arrow B to the direction or arrow C.

Figure 13:
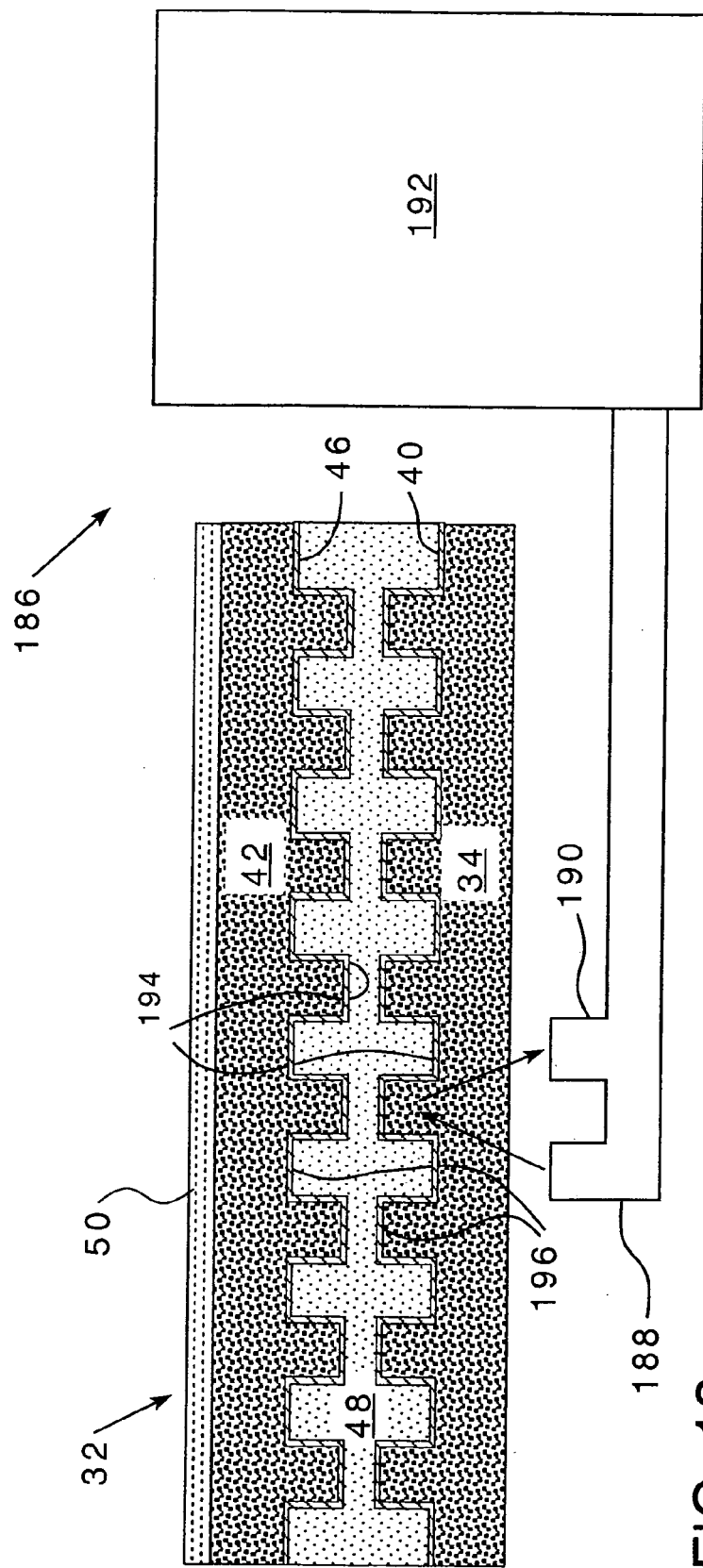
FIG. 13 is a schematic view of an apparatus for reading an optical disc, in use with a DVD9 of the present invention.

FIG. 13 illustrates the reading of an optical disc of the present invention, with the illustrated disc being a DVD9 32. The system 186 includes a laser transmitter 188 and an optical sensor 190, in communication with a microprocessor 192. As the disc 32 is rotated, the laser 188 may be focused on either the semi-transparent reflective coating 40, or the opaque reflective coating 46. The reflective laser is detected by the optical sensor 190, and the reflected signal is analyzed by the computer 192 to determine whether it was reflected off of a raised surface 194 or a pit 196. The reflectivity of the surface being read determines the data received by the microprocessor 192, with a low reflectivity resulting from a pit 196 causing a binary "zero" to be read, while a high reflectivity resulting from a raised surface 194 results in a binary "one" being read.

It will therefore be appreciated that the present invention provides a means for verifying the authenticity of an optical disc by providing a color change feature, with the color changing according to the angle at which the disc is viewed. The color change feature may be structured to be viewable from the label side, the data side, or both sides of the disc. The color change feature may be used in conjunction with an optical variable device, such as a hologram or a diffraction grating, on the label side of the disc, or on the data side of the disc, spatially separated from the data. The invention also provides a means for verifying the authenticity of double-sided discs. Although various preferred embodiments have been described in detail, any such color shifting layer may replace any reflective or semi-transparent reflective layer within an optical storage disc. For example, such a color shifting layer can also be applied to write discs (R discs) and multiple write discs (RW discs).

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An optical disc for storage of digital data, the optical disc comprising:
   a transparent base having an optically flat side and an imprinted side, the imprinted side having a plurality of indentations defining the data;
   the reflective layer disposed on the imprinted side;
   the optical disc defining an optically flat data side from which the data may be read, and a label side opposite the data side; and
   a color shifting layer including one or more layers of color shifting material, including at least one layer of liquid crystal material, the color shifting layer being disposed in a location selected from the group consisting of the reflective layer, a location viewable from the label side of the disc, and a location spatially separated from the data that is viewable from the data side of the disc.

2. The optical disc according to claim 1, wherein the liquid crystal material is a cholesteric liquid crystal material.

3. The optical disc according to claim 1, wherein each layer within the color shifting coating is a liquid crystal material.

4. The optical disc according to claim 3, wherein the color shifting layers includes a first layer of liquid crystal material orientated in a first direction.

5. The optical disc according to claim 4, wherein the color shifting layer includes a second layer of liquid crystal material, orientated in a second direction.

6. The optical disc according to claim 5, wherein the first layer and second layer are made from liquid crystal materials having a different combination of liquid crystal monomers.

7. The optical disc according to claim 1, further comprising an optical variable device structured to be viewed from a location selected from the group consisting of the label side of the disc and a location within the data side of the disc spatially separated from the label side of the disc.

8. The optical disc according to claim 7:
   further comprising a protective coating over the color-shifting layer; and
   wherein the optical variable device is formed within the transparent protective coating.

9. The optical disc according to claim 8, wherein each layer within the color shifting coating is a liquid crystal material.

10. The optical disc according to claim 9, wherein the color shifting layers includes a first layer of liquid crystal material orientated in a first direction.

11. The optical disc according to claim 10, wherein the color shifting layer includes a second layer of liquid crystal material, orientated in a second direction.

12. The optical disc according to claim 11, wherein the first layer and second layer are made from liquid crystal materials having a different combination of liquid crystal monomers.

13. The optical disc according to claim 7, wherein the color-shifting layer is deposited onto the optical variable device.

14. The optical disc according to claim 13, wherein each layer within the color shifting coating is a liquid crystal material.

15. The optical disc according to claim 14, wherein the color shifting layers includes a first layer of liquid crystal material orientated in a first direction.

16. The optical disc according to claim 15, wherein the color shifting layer includes a second layer of liquid crystal material, orientated in a second direction.

17. The optical disc according to claim 16, wherein the first layer and second layer are made from liquid crystal materials having a different combination of liquid crystal monomers.

18. The optical disc according to claim 7, wherein the optical variable device is selected from the group consisting of a hologram, a diffraction grating, and a holographic diffraction grating.

19. The optical disc according to claim 7, wherein the optical variable device is formed within a second transparent base within the optical disc.

20. The optical disc according to claim 1, wherein the optical disc is a digital versatile disc, having an opaque color-shifting layer and a semitransparent color-shifting layer.

21. The optical disc according to claim 20, wherein the opaque color-shifting layer is a color-shifting layer.

22. The optical disc according to claim 21, wherein each layer within the color shifting coating is a liquid crystal material.

23. The optical disc according to claim 22, wherein the color shifting layers includes a first layer of liquid crystal material orientated in a first direction.

24. The optical disc according to claim 23, wherein the color shifting layer includes a second layer of liquid crystal material, orientated in a second direction.

25. The optical disc according to claim 24, wherein the first layer and second layer are made from liquid crystal materials having a different combination of liquid crystal monomers.

26. A method of making an optical disc, the optical disc defining a data side from which the data may be read, and a label side opposite the data side, the method comprising:
   providing a transparent base having an optically flat side and a data side, the data side having a plurality of indentations defining the data; and
   providing a reflective layer covering the data side; and
   providing a color-shifting layer comprising one or more layers of color shifting material, including at least one layer of liquid crystal, the color shifting layer being disposed in a location selected from the group consisting of the reflective layer, a location viewable from the label side of the disc, and a location spatially separated from the data that is viewable from the data side of the disc.

27. The method according to claim 26, wherein the step of providing a color shifting coating includes the step of depositing a layer of liquid crystal material.

28. The method according to claim 27, wherein the step of providing a color shifting coating is performed by a process selected from the group consisting of silk screening, slot coating, gravure coating, reverse gravure coating, and flexography.

29. The method according to claim 27, wherein the step of providing a color shifting coating includes providing a second layer of liquid crystal material, the first layer orientated in a first direction, and the second layer orientated in a second direction.

30. The method according to claim 29, wherein each of the layers of liquid crystal material comprises a different combination of liquid crystal monomers.

31. The method according to claim 26, further comprising providing an optical variable device spatially separated from the data.

32. The method according to claim 31, wherein the optical variable device is formed by providing a protective layer, and embossing the optical variable device within the protective layer.

33. The method according to claim 32, further comprising:
   depositing a color-shifting coating on the optical variable device; and
   covering the optical variable device with a transparent protective coating.

34. The method according to claim 31, wherein the optical variable device is formed by providing a second transparent base having the optical variable device thereon, and securing) the optical variable device to the label side of the transparent base having the data.

35. The method according to claim 34, further comprising:
   depositing a color-shifting coating on the optical variable device; and
   covering the optical variable device with a transparent protective coating.

36. The method according to claim 26, wherein the liquid crystal material is deposited by a process selected from the group consisting of silk screening, slot coating, gravure coat, gravure coagravure coating, and flexography.

37. The method according to claim 26, wherein the step of providing a color shifting coating over the optical variable device includes depositing a second layer of liquid crystal material upon the first layer of liquid crystal material, the first layer of liquid crystal material having a first orientation, and the second layer of liquid crystal material having a second orientation.

38. The method according to claim 37, wherein each of the layers of liquid crystal material includes a different combination of liquid crystal monomers.

* * * * *

UNITED STATES PATENT AND TRADEMARK OFFICE
CERTIFICATE OF CORRECTION

PATENT NO. : 7,269,123 B2 Page 1 of 1
APPLICATION NO. : 11/146765
DATED : September 11, 2007
INVENTOR(S) : Nigel Abraham et al.

It is certified that error appears in the above-identified patent and that said Letters Patent is hereby corrected as shown below:

Column 3, line 33, "gyrating" should be --grating--.

Column 12, lines 5-6, "securing)" should be --securing--.

Column 12, line 17, "gravure coat" should be --gravure coating--.

Column 12, line 18, "gravure coagruvure coating" should be --reverse gravure coating--.

Signed and Sealed this

First Day of July, 2008

JON W. DUDAS
*Director of the United States Patent and Trademark Office*